United States Patent
Numata et al.

(10) Patent No.: US 9,658,411 B2
(45) Date of Patent: May 23, 2017

(54) ALIGNMENT OF SINGLE-MODE POLYMER WAVEGUIDE (PWG) ARRAY AND SILICON WAVEGUIDE (SIWG) ARRAY OF PROVIDING ADIABATIC COUPLING

(71) Applicant: International Business Machines Corporation, Armonk, NY (US)

(72) Inventors: Hidetoshi Numata, Kanagawa (JP); Yoichi Taira, Tokyo (JP); Masao Tokunari, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/152,853

(22) Filed: May 12, 2016

(65) Prior Publication Data
US 2016/0252686 A1 Sep. 1, 2016

Related U.S. Application Data

(62) Division of application No. 14/050,450, filed on Oct. 10, 2013, now Pat. No. 9,372,305.

(30) Foreign Application Priority Data

Oct. 18, 2012 (JP) ................. 2012-231097

(51) Int. Cl.
| | | |
|---|---|---|
| G02B 6/00 | (2006.01) | |
| G02B 6/34 | (2006.01) | |
| G02B 6/42 | (2006.01) | |
| G02B 6/10 | (2006.01) | |
| G02B 6/122 | (2006.01) | |
| B29C 33/38 | (2006.01) | |
| B29D 11/00 | (2006.01) | |
| G02B 6/38 | (2006.01) | |
| G02B 6/12 | (2006.01) | |
| G02B 6/28 | (2006.01) | |

(52) U.S. Cl.
CPC ............... *G02B 6/421* (2013.01); *G02B 6/10* (2013.01); *G02B 6/1221* (2013.01);
(Continued)

(58) Field of Classification Search
CPC ............ G02B 6/12011; G02B 6/12019; G02B 6/12021
See application file for complete search history.

(56) References Cited

U.S. PATENT DOCUMENTS 9,008,477 B2 *   4/2015   Numata ............... G02B 6/1221
                                                                385/39
9,372,305 B2 *   6/2016   Numata ............... G02B 6/4292
(Continued)

FOREIGN PATENT DOCUMENTS

JP    H06109936 A    4/1994
JP    H0745811 A     2/1995
(Continued)

*Primary Examiner* — Hemang Sanghavi
(74) *Attorney, Agent, or Firm* — Scully, Scott, Murphy & Presser, P.C.; David M. Quinn, Esq.

(57) ABSTRACT

A structure includes a combination of a stub fabricated on a polymer and a groove fabricated on a silicon (Si) chip, with which an adiabatic coupling can be realized by aligning a (single-mode) polymer waveguide (PWG) array fabricated on the polymer with a silicon waveguide (SiWG) array fabricated on the silicon chip. The stub fabricated on the polymer is patterned according to a nano-imprint process along with the PWG array in a direction in which the PWG array is fabricated. The groove fabricated on the silicon chip is fabricated along a direction in which the SiWG array is fabricated.

6 Claims, 8 Drawing Sheets

(52) U.S. Cl.
CPC ......... *G02B 6/4239* (2013.01); *G02B 6/4269* (2013.01); *G02B 6/4292* (2013.01); *B29C 33/3857* (2013.01); *B29D 11/00663* (2013.01); *G02B 6/12002* (2013.01); *G02B 6/2821* (2013.01); *G02B 6/3885* (2013.01); *G02B 6/423* (2013.01); *G02B 6/4204* (2013.01); *G02B 2006/12147* (2013.01)

(56) References Cited

U.S. PATENT DOCUMENTS

| | | | |
|---|---|---|---|
| 2002/0001432 A1* | 1/2002 | Ueda | G02B 6/12014 385/37 |
| 2004/0021237 A1 | 2/2004 | Shimizu et al. | |
| 2006/0274995 A1* | 12/2006 | Lee | G02B 6/12011 385/37 |
| 2009/0196562 A1 | 8/2009 | Ishida et al. | |
| 2013/0292052 A1 | 11/2013 | Jeong et al. | |

FOREIGN PATENT DOCUMENTS

| | | |
|---|---|---|
| JP | H11258455 A | 9/1999 |
| JP | 200075158 A | 3/2000 |
| JP | 2004102220 A | 4/2004 |
| JP | 2005208187 A | 8/2005 |
| JP | 2006139147 A | 6/2006 |
| JP | 2007212786 A | 8/2007 |
| JP | 200858530 A | 3/2008 |
| JP | 200889879 A | 4/2008 |
| JP | 200931780 A | 2/2009 |

\* cited by examiner

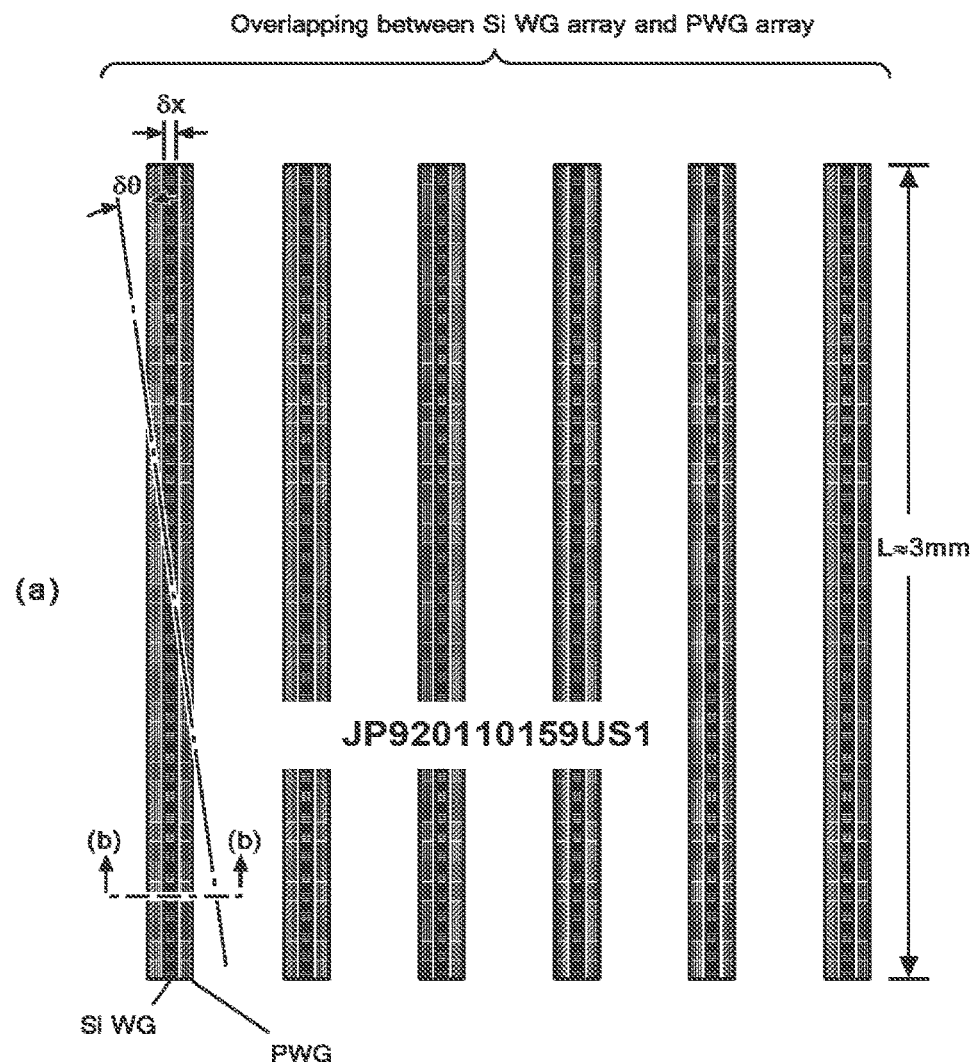
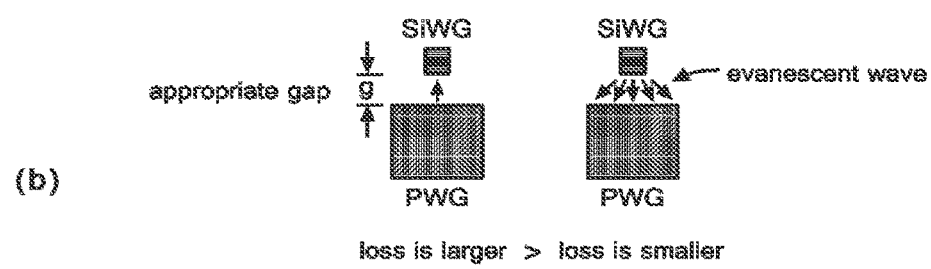
FIG. 2

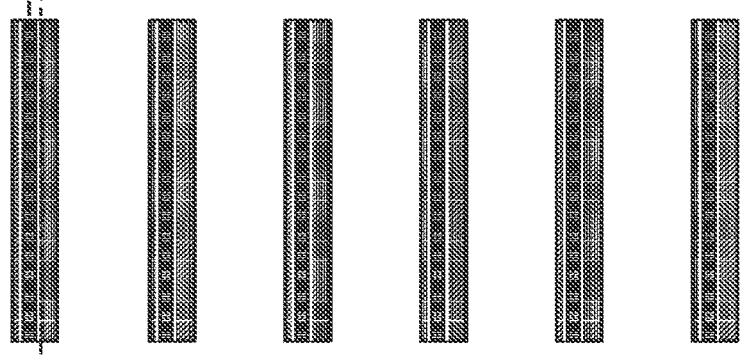
(a)
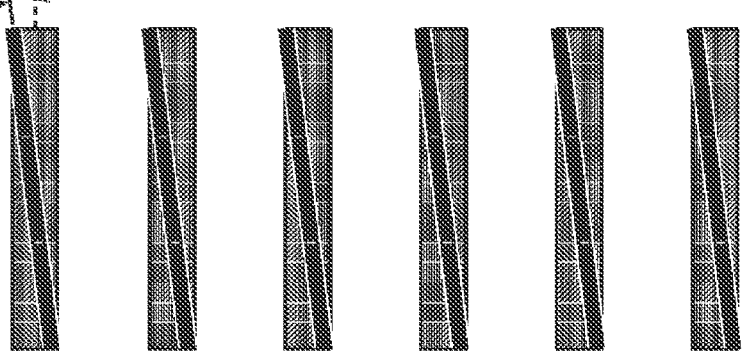
(b)
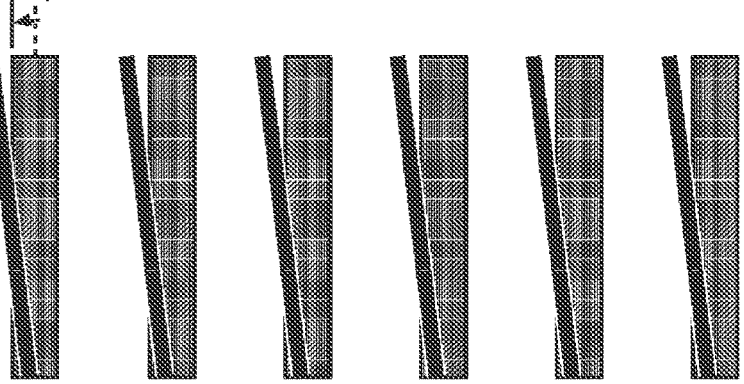
(c)
FIG. 3

(a) PWG patterning by nano-imprint

Patterning a complicated structure in vertical direction at sub-micro meter precision is possible.
Because it can avoid the mechanical distortion caused by a heat or a pressure, in either of horizontal direction(X) or vertical direction(Y)

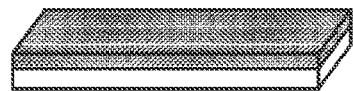

1. Coat a polymer on a glass substrate

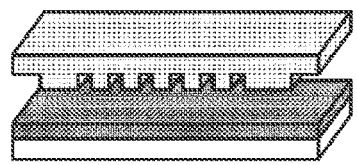

2. Put a metal cast on a polymer

⇑ ⇑ ⇑ ⇑ ⇑
UV exposure

3. Exposure UV light

4. Remove a cast from a polymer (b) PWG patterning by photolithography

Patterning at sub-micro meter precision is possible, but it is impossible to fabricate a complicated structure in vertical direction

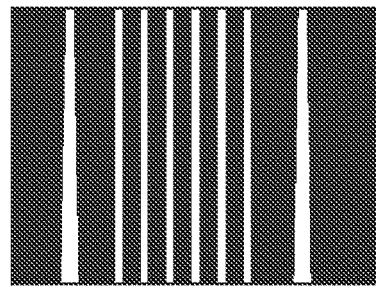

1. Make a glass photo-mask

UV exposure
⇓ ⇓ ⇓ ⇓ ⇓ ⇓    core

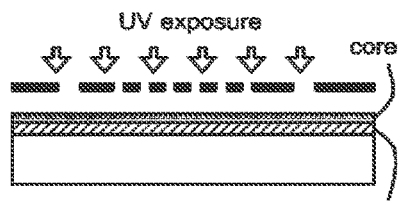

2. Exposure UV light     (under) clad developper
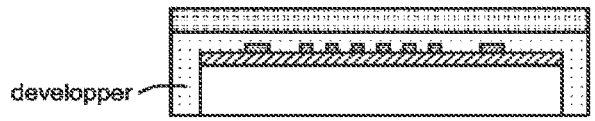

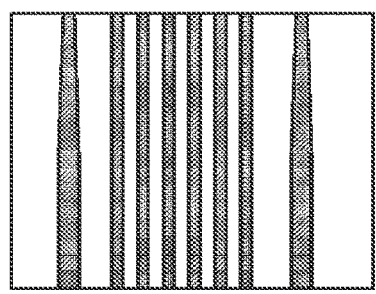

3. Development

FIG. 7

ALIGNMENT OF SINGLE-MODE POLYMER WAVEGUIDE (PWG) ARRAY AND SILICON WAVEGUIDE (SIWG) ARRAY OF PROVIDING ADIABATIC COUPLING

CROSS REFERENCE TO RELATED PATENTS AND APPLICATIONS

This application claims priority under 35 U.S.C. §119 to Japanese Patent Application No. 2012-231097, filed Oct. 18, 2012, the entire contents of which are incorporated herein by reference. Further, the application is a continuation application of U.S. Ser. No. 14/050,450 filed Oct. 10, 2013, the entire contents of which are incorporated herein by reference.

FIELD

The present invention relates to provision of a coupling allowing transmission of light between a polymer waveguide (PWG) array and a silicon waveguide (SiWG) array. More specifically, the present invention relates to a technique of providing high-precision alignment of arrays in a single-mode polymer waveguide (PWG) so that an adiabatic coupling is provided.

DESCRIPTION OF THE RELATED ART

Both multimode and single-mode polymer waveguides (PWG) are widely used either in a rigid form on a printed board, or in a flexible form on a polymer base film.

The principle of optical waveguide (WG) is that a combination of core and clad, which is a combination of two different type polymers having a different refractive index, is provided and the core is used as a light transmitting path.

On the other hand, silicon waveguides (SiWG) in which a light transmitting path is fabricated on a silicon (Si) chip are also widely used.

Both in the polymer waveguide (PWG) and in the silicon waveguide (SiWG), multi-channel waveguides (WG) are fabricated in array in one direction in parallel with each other so that multi-channel light transmitting paths are provided.

Attempts have been made to transmit light between the polymer waveguide (PWG) and the silicon waveguide (SiWG). However, a coupling which allows light to be transmitted efficiently at the microscopic level requires high-precision positioning.

In the case of multimode waveguides (WG), when the waveguides are coupled to each other or when the waveguide is coupled to a multimode optical fiber, a large cross section of core and almost the same size of core cross section and almost the same numerical apertures can provide such coupling with an acceptable level of loss as long as a precise positioning of the abutting cross sections is guaranteed between the cross sections coming into connection with each other.

Actually, what is called a "Butt Coupling" is used to provide the above coupling.

However, when a single-mode waveguide (WG) is coupled to a silicon waveguide (SiWG), the cross section of core is very small and the connected waveguides are very different from each other in the size of core cross section and in the numerical aperture. Thus, it is even difficult to use the Butt Coupling.

In this case, adiabatic coupling may be used as an alternative method by which evanescent light in an optical axis direction along the array is captured and transmitted over a predetermined distance in the optical axis direction.

However, a technique is still unknown which, when a single-mode waveguide (WG) is coupled to a silicon waveguide (SiWG), provides high-precision alignment of arrays to provide the adiabatic coupling.

Concerning innovative methods for fabricating polymer waveguides (PWG) or positioning multi-channel polymer waveguides (PWG), a variety of elemental techniques are known, such as those described in Japanese Patent Application Publications: No. 200075158A; No. 2004102220A; No. 20085853A; No. 6109936A; No. 2006139147A; No. 2005208187A; No. 200889879A; No. 200931780A; No. 2007212786A; No. 745811A; No. 11258455A.

However, a literature is still unknown which provides the adiabatic coupling or refers to high-precision alignment such as self-alignment for providing the adiabatic coupling.

SUMMARY OF THE INVENTION

An object of the present invention is to align a (single-mode) polymer waveguide (PWG) array fabricated on polymer and a silicon waveguide (SiWG) array fabricated on a silicon (Si) chip and thereby realize an adiabatic coupling.

The present invention provides a structure having a combination of (i) a stub fabricated on a polymer and (ii) a groove fabricated on a silicon (Si) chip, with which an adiabatic coupling can be realized by aligning (a) a (single-mode) polymer waveguide (PWG) array fabricated on the polymer with (b) a silicon waveguide (SiWG) array fabricated on the silicon chip; wherein, the stub fabricated on the polymer is patterned according to a nano-imprint process, along with the PWG array, in a direction in which the PWG array is fabricated, and the groove fabricated on the silicon chip is fabricated along a direction in which the SiWG array is fabricated.

The present invention also discloses a method of fabricating on a polymer a (single-mode) polymer waveguide (PWG) array and a stub so that the (single-mode) polymer waveguide (PWG) array and the stub are aligned with a silicon waveguide (SiWG) array fabricated on a silicon (Si) chip and a groove fabricated along a direction in which the SiWG is fabricated, whereby an adiabatic coupling is realized, the method includes the steps of: preparing a polymer base layer; placing on the polymer base layer a cast having a groove corresponding to a core of the (single-mode) polymer waveguide (PWG) array and a groove corresponding to the stub; hardening the polymer base layer; and removing the case from the hardened polymer base layer.

BRIEF DESCRIPTION OF THE DRAWINGS

FIG. 2 is a top view for explaining overlapping of a silicon waveguide (SiWG) array and a polymer waveguide (PWG) array and for explaining evanescent wave involved in adiabatic coupling;

FIG. 3 is a top view for explaining the importance of alignment for overlapping of a silicon waveguide (SiWG) array and a polymer waveguide (PWG) array;

FIG. 7 is a view for explaining respective methods of PWG patterning by photolithography and PWG patterning by nano-imprint when the polymer waveguide (PWG) array and the stub are fabricated according to the present invention.

DETAILED DESCRIPTION OF THE PREFERRED EMBODIMENTS

Figure 1:
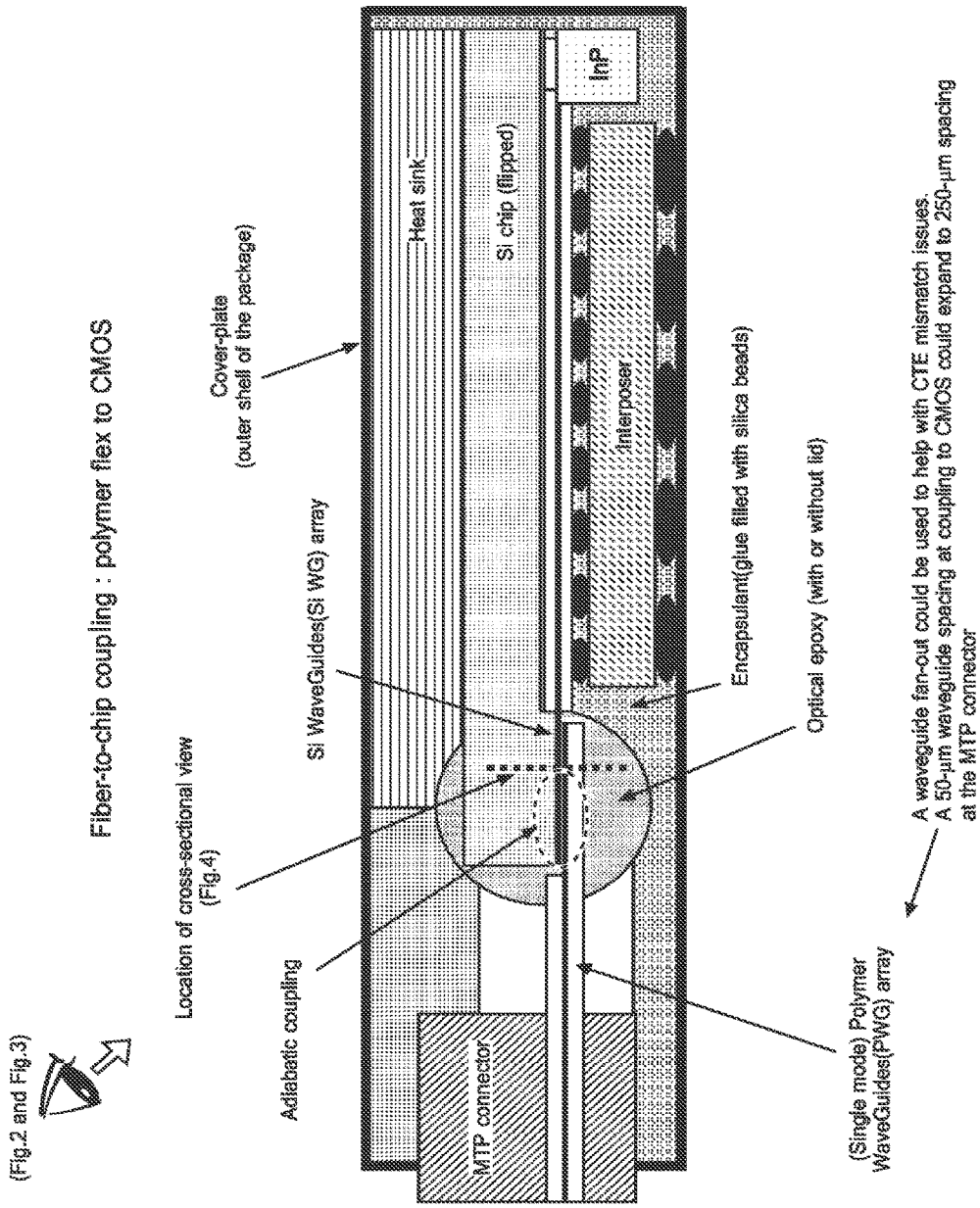
FIG. 1 is an overall view illustrating an area in which the inventive adiabatic coupling is provided and the structure of a package containing the area.

FIG. 1 is an overall view illustrating an area in which the inventive adiabatic coupling is provided and the structure of a package containing the area.

Adiabatic coupling is realized by aligning a (single-mode) polymer waveguide (PWG) array fabricated on a polymer with a silicon waveguide (SiWG) array fabricated on a silicon (Si) chip. The combined coupling portions in which this adiabatic coupling is provided are secured by an optical epoxy or a UV adhesive.

Further included are an MTP connector secured to the polymer and an interposer secured to the silicon chip; these are encapsulated. For example, an adhesive filled with silica beads is used.

Further included are a heat sink secured to the silicon chip and a cover plate (the outer shell of the package); the whole body is covered by the cover plate. The cover plate functions as the outer shell of the package.

In accordance with a connotational relationship of this package structure, a fabrication (assembly) method may be provided which includes a sequence of the following steps 1 to 10.

(1) Firstly, a silicon (Si) chip is prepared which has a silicon waveguide (SiWG) array fabricated therein.

(2) A polymer is prepared which has a (single-mode) polymer waveguide (PWG) array fabricated therein.

(3) The silicon chip and the polymer are aligned in a manner having a spatial relationship by which optical coupling can be realized.

(4) The silicon chip and the polymer are secured to each other by an optical epoxy or a UV adhesive (while the state of alignment is maintained).

(5) An MTP connector is prepared which is secured to the polymer.

(6) An interposer is prepared which is secured to the silicon chip.

(7) These are encapsulated. An adhesive filled with silica beads may be used.

(8) A heat sink is prepared which is secured to the silicon chip.

(9) A cover plate (the outer shell of the package) is prepared.

(10) The whole body is covered by the cover plate to form a package structure.

FIG. 2 is a top view for explaining overlapping of the silicon waveguide (SiWG) array and the polymer waveguide (PWG) array, and also for explaining evanescent wave involved in adiabatic coupling.

These arrays are, as illustrated in FIG. 2(a), overlapped over a predetermined distance in an optical axis direction, whereby evanescent light is captured and transmitted.

In the verification of the predetermined distance in an optical axis direction for the present invention, length L is approximately 3 mm (fabrication error being ±20%). However, those skilled in the art may calculate a theoretically optimum length based on the conditions.

This type of optical coupling is known as an adiabatic coupling.

The width of core of the silicon waveguide (SiWG) array is, as illustrated in FIG. 2(b), smaller than that of the polymer waveguide (PWG) array.

In the verification for the present invention, a case is verified in which the width of core of the (single-mode) polymer waveguide (PWG) array fabricated on the polymer is approximately 5 μm (fabrication error being ±20%) and the width of core of the silicon waveguide (SiWG) array fabricated on the silicon (Si) chip is approximately several hundred nm to 1 μm (fabrication error being ±30%).

Bilateral optical transmission exists between the silicon waveguide (SiWG) array and the polymer waveguide (PWG) array. However, since a scale difference in the width of core exists between the SiWG array and the PWG array, there is a difference in the size of optical loss.

Evanescent wave transmitted from the side of SiWG to the side of PWG is easy to capture on the side of PWG. However, evanescent wave transmitted from the side of PWG to the side of SiWG is relatively difficult to capture on the side of SiWG.

The verification indicates that when the combination of the widths of core above described is used, it is appropriate to set gap g to 3 μm or so (fabrication error being ±20%). However, the appropriate size of gap g is affected by the wavelength of transmitted light and the mode field diameter (MFD). Those skilled in the art may determine the appropriate size of gap g.

FIG. 3 is a top view for explaining the importance of alignment for overlapping of the silicon waveguide (SiWG) array and the polymer waveguide (PWG) array.

A slight amount δx of misalignment illustrated in FIG. 3(a) causes a loss of light transmission.

A slight amount δθ of inclination illustrated in FIG. 3(b) causes a loss of light transmission.

It can be seen that when misalignment of δx and inclination of δθ are, as illustrated in FIG. 3(c), combined, a greater amount of loss arises.

From the above description, it is understood that the alignment is very important for overlapping of the silicon waveguide (SiWG) array and the polymer waveguide (PWG) array.

Figure 4:
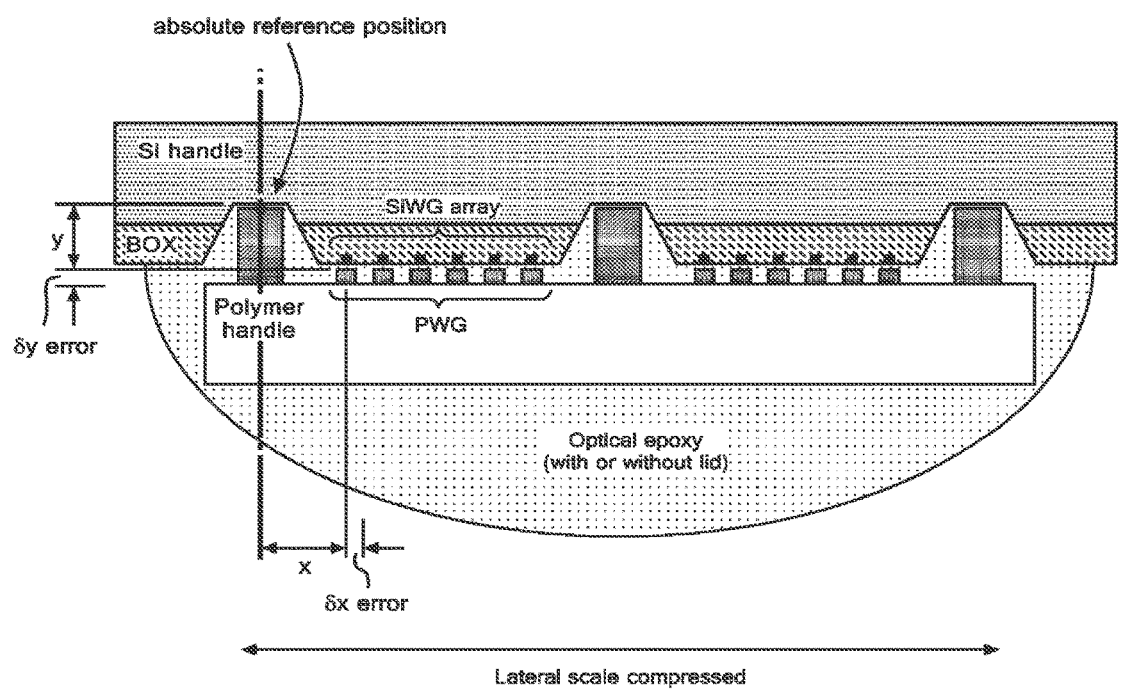
FIG. 4 is an overall view illustrating a combination of a stub fabricated on polymer and a groove fabricated on a silicon chip, the combination allowing alignment of a (single-mode) polymer waveguide (PWG) array fabricated on polymer and a silicon waveguide (SiWG) array fabricated on a silicon (Si) chip whereby the adiabatic coupling is realized according to the present invention.

FIG. 4 is an overall view illustrating a combination of a stub fabricated on the polymer and a groove fabricated on the silicon chip, the combination allows alignment of the (single-mode) polymer waveguide (PWG) array fabricated on the polymer and the silicon waveguide (SiWG) array fabricated on the silicon (Si) chip whereby the adiabatic coupling is realized according to the present invention.

In the present invention, the (single-mode) polymer waveguide (PWG) array fabricated on the polymer and the silicon waveguide (SiWG) array fabricated on the silicon (Si) chip are self-aligned according to the groove and the stub highly precisely fabricated on both sides.

The sum of the present invention is that the groove and the stub are made to function as the absolute positioning reference to perform the self-alignment according to the groove and the stub.

Figure 5:
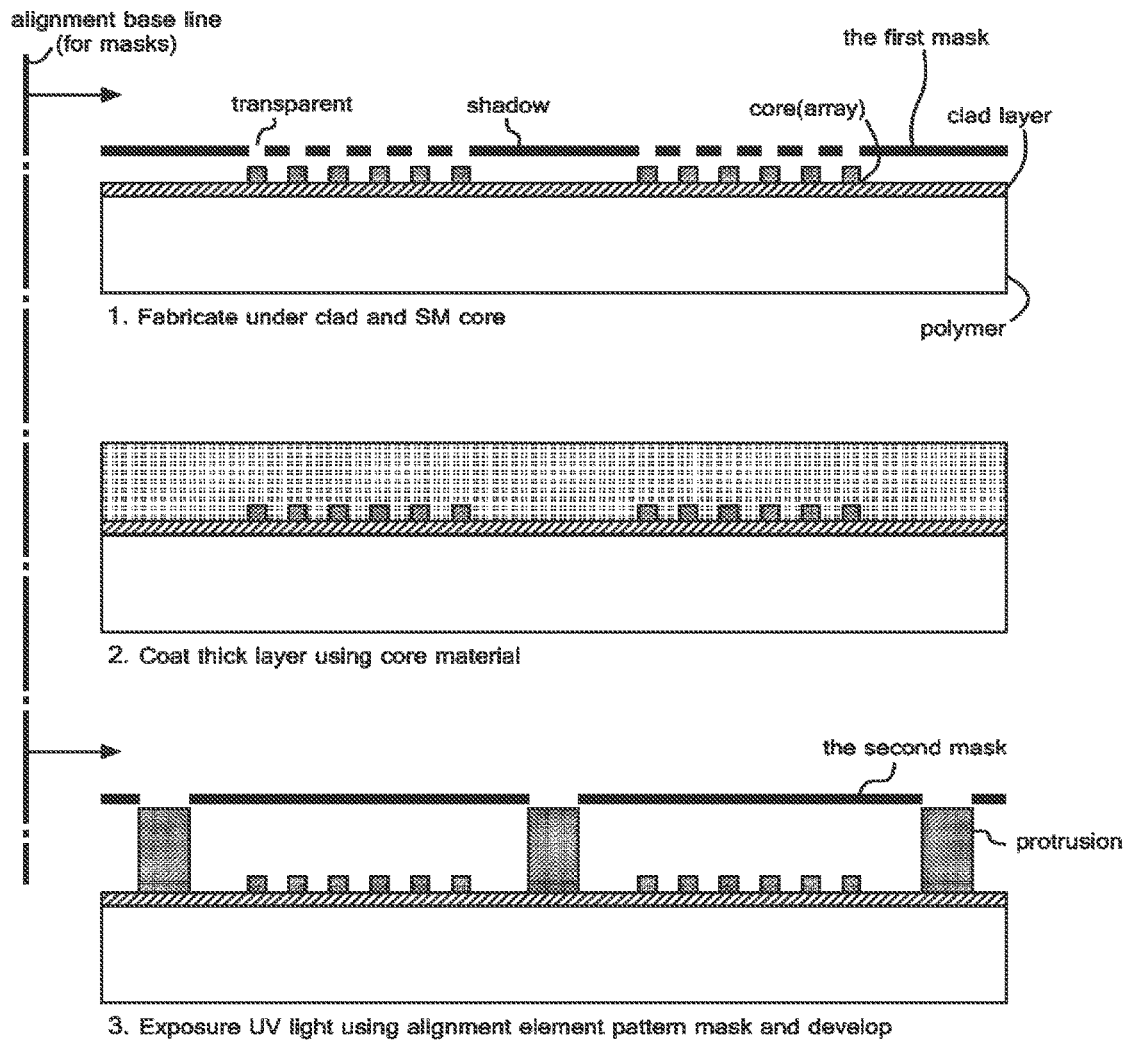
FIG. 5 is a view illustrating the inventive method of highly precisely fabricating on polymer a (single-mode) polymer waveguide (PWG) array and a stub.

FIG. 5 is a view illustrating the inventive method of highly precisely fabricating on the polymer a (single-mode) polymer waveguide (PWG) array and the stub.

The (single-mode) polymer waveguide (PWG) array and the stub may be highly precisely fabricated in an integrated manner, so that the stub and the groove function as the absolute positioning reference.

(1) Firstly, an (under) clad layer is coated on the polymer.

(2) A first mask is prepared along the alignment base line above the coated core layer and (under) clad layer.

(3) Multi-channel cores (or a core array) are fabricated on the clad layer by a photolithography process with a first mask. Here, the refraction index of the core layer material is larger than that of the clad layer material.

(4) Using a same type polymer material as that of the core array, a base layer used to fabricate the stub is coated so that the core array is covered.

(5) A second mask (having an exposure pattern different from the first mask) is prepared along the same alignment base line used to prepare the first mask. Here, it can be seen that, since the same alignment base line (for mask) is used, when the distance between the stub used as the absolute positioning reference and the multi-channel cores (the core array or one of the cores in the array) is x (FIG. 4), the positioning error in x-axis δx is minimized so that the assembly is highly precisely performed.

(6) The stub is fabricated by a photolithography process with a second mask.

Both the material of the core used to fabricate the core array by the photolithography process with the first mask and the material of the base layer used to fabricate the stub by the photolithography process with the second mask may be selected from same type polymer materials, such as acrylic, epoxy, or polyimide.

Preferably, developer and rinse liquid used in the photolithography process using the first mask is similar to those used in the photolithography process using the second mask. This is needed to ensure that the core array fabricated by the photolithography process with the first mask maintain their shape in the developing step of the photolithography process with the second mask. When the developer and rinse liquid are used again as it is, the whole process becomes simpler.

Figure 6:
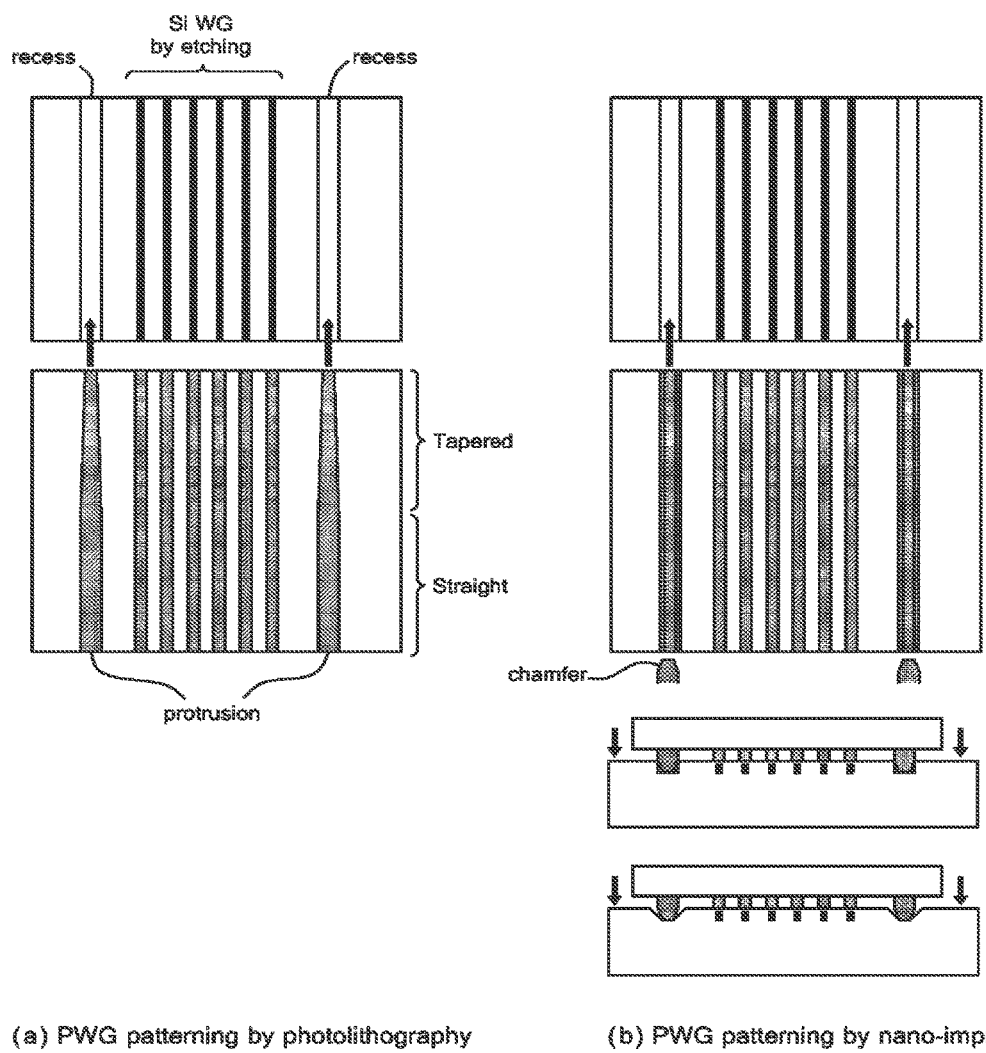
FIG. 6 is a view for explaining respective advantages of PWG patterning by photolithography and PWG patterning by nano-imprint when the polymer waveguide (PWG) array and the stub are fabricated according to the present invention.

FIG. 6 is a view for explaining respective advantages of PWG patterning by photolithography and PWG patterning by nano-imprint when the polymer waveguide (PWG) array and the stub are fabricated according to the present invention.

In both the PWG patterning by photolithography and the PWG patterning by nano-imprint, a straight portion and a tapered portion may be provided in the stub.

The provision of the tapered portion in the stub is advantageous in that, when the stub is inserted in a sliding manner into the groove fabricated on the silicon chip, the insertion is more easily performed.

In the PWG patterning by photolithography, the thickness control of the stub may be precisely performed by a spin coat process.

In the PWG patterning by nano-imprint, a metal cast is used which is prepared in advance by a precise cutting process; accordingly, the thickness control of the stub and the fabrication of a complicated structure of the stub in a height direction can be performed with a sub-micro meter precision. Thus, a chamfer can be provided with high precision.

The provision of the chamfer in the stub is advantageous in that, when the stub is placed or thrusted into the groove fabricated on the silicon chip, the placement or insertion is more easily performed.

In this way, when the PWG patterning by photolithography or nano-imprint is used, the insertion can be more easily performed in a sliding or thrusting manner. Furthermore, when the distance between the stub used as the absolute positioning reference and the core array (one of the cores) is x in horizontal direction and y in vertical direction (FIG. 4), the positioning error in x-axis δx and that in y-axis δy are minimized so that the assembly is highly precisely performed.

The groove fabricated on the silicon chip may be highly precisely fabricated by etching or the like along with the silicon waveguide (SiWG) array fabricated on the silicon (Si) chip.

FIG. 7 is a view for explaining respective methods of PWG patterning by photolithography and PWG patterning by nano-imprint when the polymer waveguide (PWG) array and the stub are fabricated according to the present invention.

In the PWG patterning by nano-imprint, (1) Firstly, the base layer of polymer is prepared. Alternatively, a polymer may be coated on a glass substrate.

(2) A cast having a groove corresponding to the core of the (single-mode) polymer waveguide (PWG) array and a groove corresponding to the stub thereof is placed on the base layer of polymer. The cast may be of metal. It is known that when the metal cast is used, a high precision is easily achieved.

(3) The base layer of polymer is hardened. UV exposure may be performed. The polymer (the base layer) and the glass substrate may be UV-transparent.

(4) The cast is removed from the hardened base layer of polymer.

Figure 8:
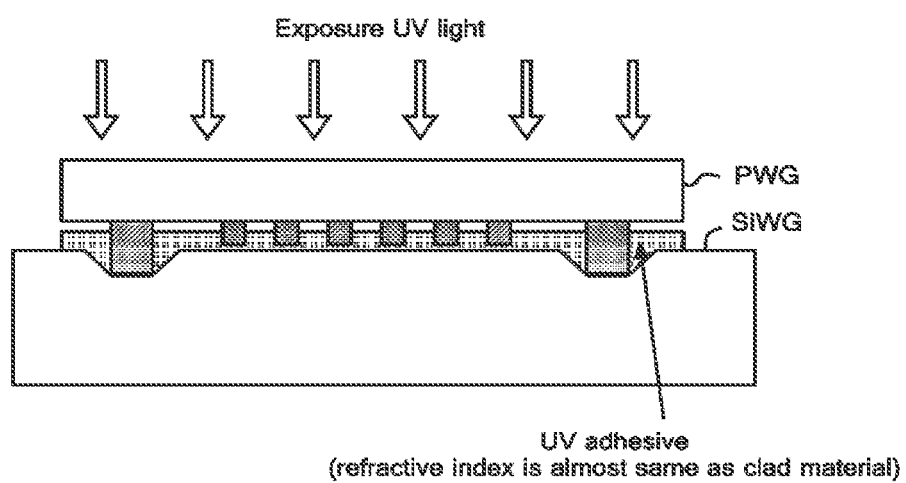
FIG. 8 is a view for explaining a method of aligning the silicon waveguide (SiWG) array and the polymer waveguide (PWG) array and then securing the arrays, and for explaining the state after the arrays have been secured.

FIG. 8 is a view for explaining a method of aligning the silicon waveguide (SiWG) array and the polymer waveguide (PWG) array and then securing the arrays, and for explaining the state after the arrays have been secured.

The package structure including the adiabatic coupling provided according to the present invention may also be provided as a fabrication method according to the connotational relationship described in FIG. 1.

What is claimed is:

1. A structure comprising a combination of a stub fabricated on a polymer and a groove fabricated on a silicon (Si) chip, with which an adiabatic coupling is realized by aligning a (single-mode) polymer waveguide (PWG) array fabricated on the polymer with a silicon waveguide (SiWG) array fabricated on the silicon chip, wherein the stub fabricated on the polymer is patterned according to a nano-imprint process, along with the PWG array, in a direction in which the PWG array is fabricated, and wherein the groove fabricated on the silicon chip is fabricated along a direction in which the SiWG array is fabricated.

2. The structure according to claim 1, wherein the polymer and the silicon chip are secured to each other by an optical epoxy or a UV adhesive.

3. The structure according to claim 2, further comprising an MTP connector secured to the polymer and an interposer secured to the silicon chip, wherein the MTP connector and the interposer are encapsulated.

4. The structure according to claim 3, further comprising a heat sink secured to the silicon chip and a cover plate, wherein the whole body is covered by the cover plate.

5. The structure according to claim 1,
wherein a width of core of the (single-mode) polymer waveguide (PWG) array fabricated on the polymer is approximately 5 μm, and a width of core of the silicon waveguide (SiWG) array fabricated on the silicon (Si) chip is approximately several hundred nm to 1 μm.

6. The structure according to claim 1,
wherein a width of core of the (single-mode) polymer waveguide (PWG) array fabricated on the polymer is larger than a width of core of the silicon waveguide (SiWG) array fabricated on the silicon (Si) chip.

* * * * *